March 10, 1970  H. T. HUELE ET AL  3,500,402
PPI DISPLAY SYSTEMS

Filed April 19, 1967  6 Sheets-Sheet 1

INVENTORS
HENDRIK T. HUELE
JOSEPHUS A. WIJNEN

BY
AGENT

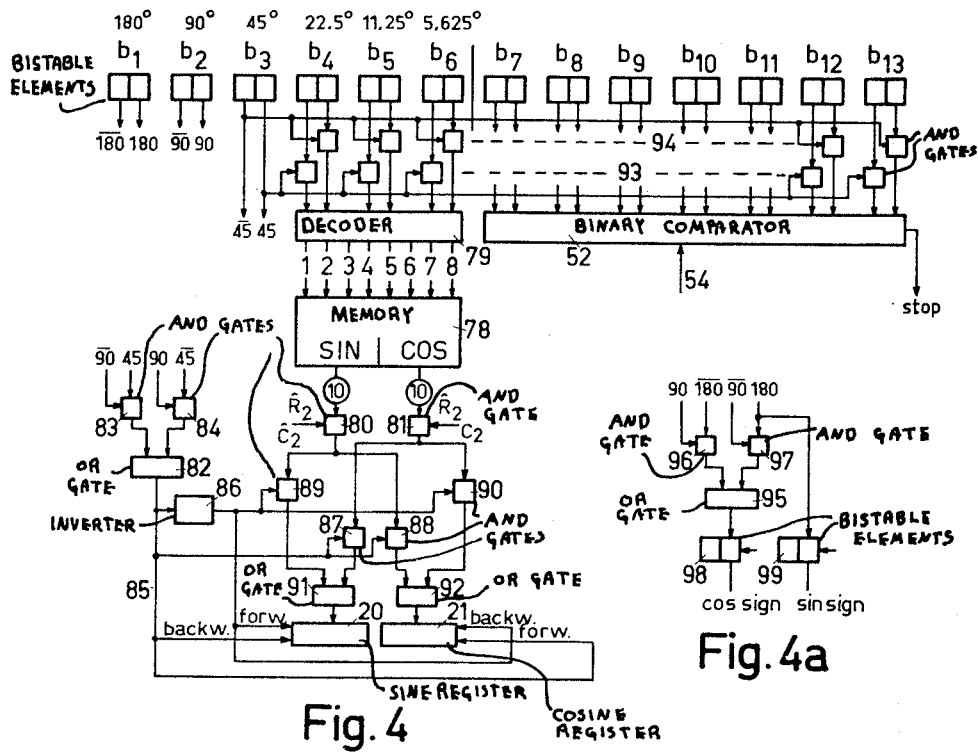
Fig. 4
Fig. 4a
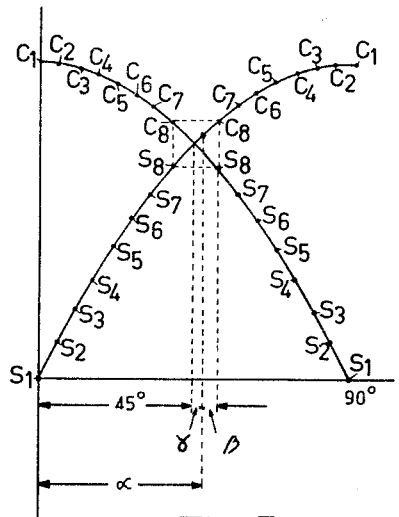
Fig. 5
INVENTORS
HENDRIK T. HUELE
JOSEPHUS A. WIJNEN
BY *Frank R. ...*
AGENT

United States Patent Office 3,500,402
Patented Mar. 10, 1970

3,500,402
PPI DISPLAY SYSTEMS
Hendrik Teunis Huele and Josephus Anthonie Wijnen, Hengelo, Overijssel, Netherlands, assignors to N.V. Hollandse Signaalapparaten, Hengelo, Overijssel, Netherlands, a firm of the Netherlands
Filed Apr. 19, 1967, Ser. No. 631,965
Claims priority, application Netherlands, Apr. 20, 1966, 6605240
Int. Cl. G01s 9/06
U.S. Cl. 343—11     6 Claims

ABSTRACT OF THE DISCLOSURE

A radar system of the type having a PPI display develops analogue deflection signals from a digital sawtooth generator. The sawtooth generator may be in the form of a range counter having its output masked with digital sine and cosine signals in a binary multiplier and applied to X and Y counters. The sine and cosine signals are derived from registers stepped from the output of binary multipliers in which the output of an angle increment counter is cross masked with the outputs of the registers. The registers are initially set by input pulses applied during dead time, the number of pulses applied being controlled in a comparator in accordance with the antenna position stored in an azimuth counter.

---

The invention relates to PPI display systems of the type comprising a cathode ray tube with fixed orthogonal deflector means, a resolver providing in digital form the sine and cosine of angular information offered, a digital sawtooth generator, means for activating said sawtooth generator in successive deflection signal intervals to produce sawtooth signals, the slope of which is modulated in accordance with said sine and cosine, and means for feedinng the sawtooth signals by way of digital-to-analog converting means to said cathode ray tube deflector means. Systems of this kind are, for instance, applied in pulse radar equipment.

In spite of their relatively complicated design, the possibilities of these known PPI systems are limited because, apart from the information supplied by the pulse radar equipment, only carthesian markers can be displayed on the tube face. In order that decisions may be taken on the basis of the picture presented, more extensive information is often required, e.g., by the addition of cursors offered in polar coordinates $(\rho, \varphi)$; a shift of the cursors with respect to the center of the tube face (cursor off-centering); a shift of the entire picture (picture off-centering) and corrections in connection with own course and speed ($k_e$ and $v_e$).

The object of the invention is to provide improved digital display systems of greater flexibility which moreover shall be such as to permit a substantial saving of elements.

According to the invention a PPI display system of the type described comprises a resolver consisting of a sine-cosine generator in the form of a digital differential analyzer, while the system further comprises control means for activating said sine-cosine generator only in the time interval between two successive deflection signal intervals (dead time) for the time required by said sine-cosine generator to produce the sine and cosine for the sawtooth signals to be generated in the next deflection signal interval (listening time).

The invention is illustrated with reference to the accompanying drawings in which:

FIGS. 4 and 4a are diagrams showing part of the system of FIG. 3 in further detail.

FIG. 5 shows part of a sine and a cosine curve for the purpose of explaining the operation of the circuits of the diagrams of FIGS. 4 and 4a.

Figure 1:
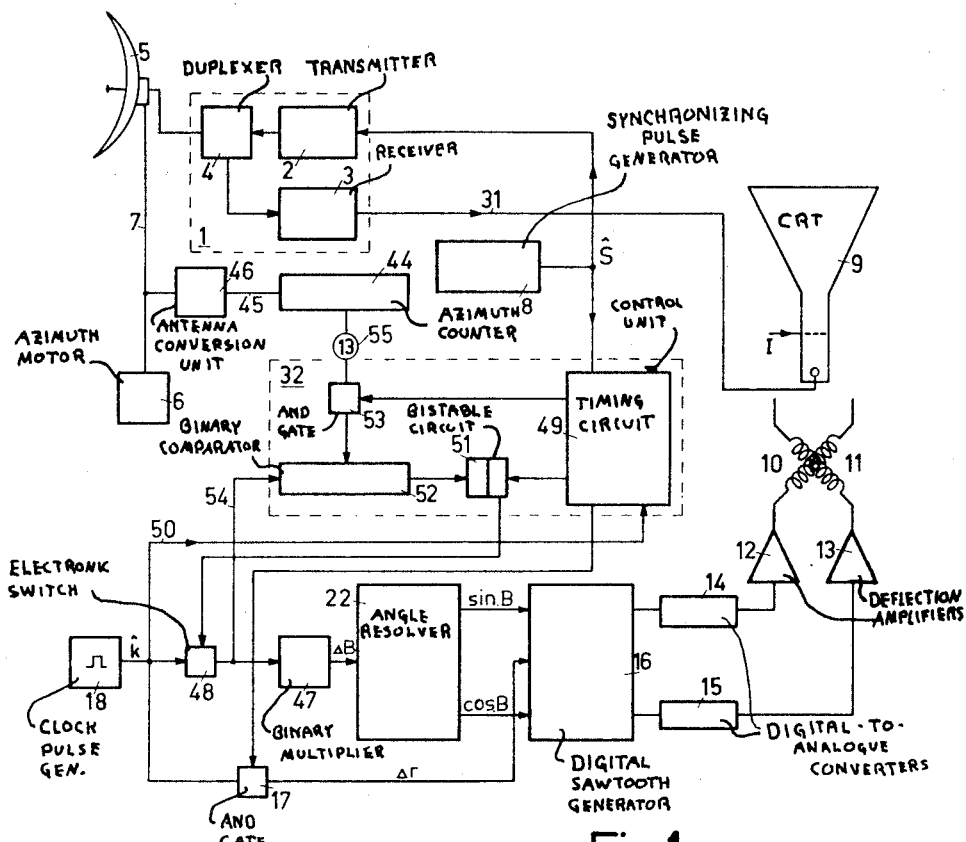
FIG. 1 is a block diagram illustrating a radar system with a plan position display system according to the invention.

Like reference numerals denote like parts in the various figures. For brevity and for simplifying the drawings where a number of parallel transmitted digital signals occur, each respectively indicative of a different significant binary value, the plurality of conductors carrying such signals is indicated by a single line with an encircled number thereon. Thus the encircled number ⑬ at 55 indicates 13 conductors in said line.

Figure 2:
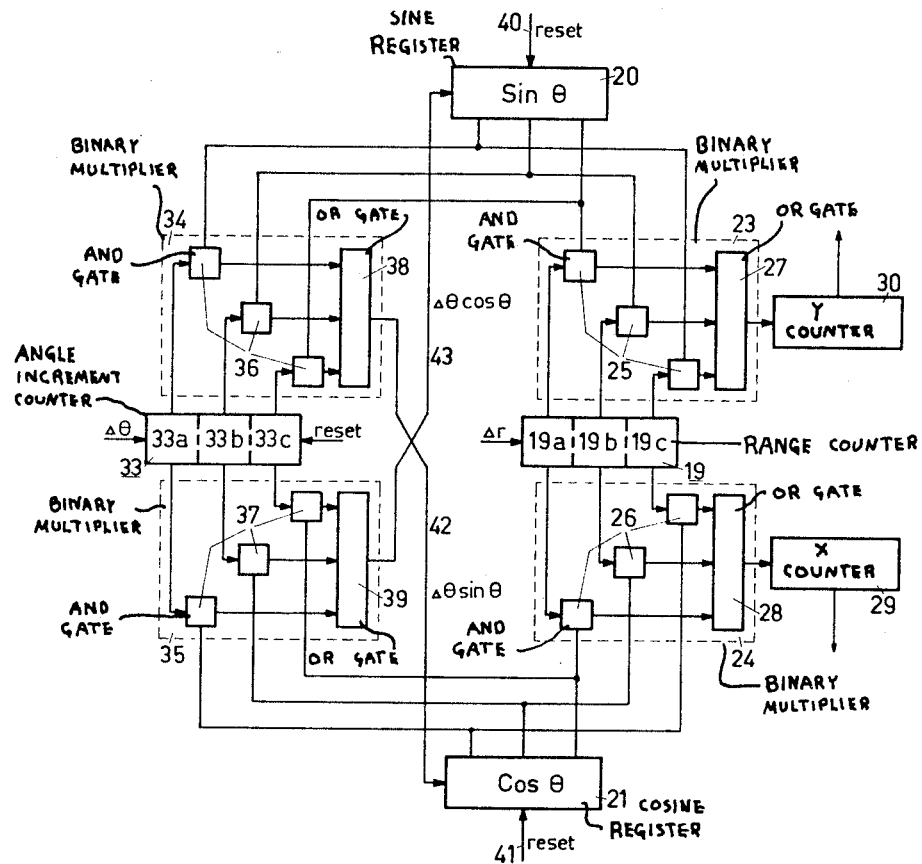
FIG. 2 shows the block diagram of a digital sine-cosine generator and sawtooth generator as may be used in the apparatus of FIG. 1.

FIG. 1 shows a continuously operating pulse radar apparatus 1 consisting of a transmitter 2 and a receiver 3 which are coupled via a duplexer 4 to a search antenna 5, which is driven by azimuth motor 6. This antenna rotates continuously about its axis of rotation 7 and is fed with pulses of short duration supplied by the transmitter 2 in response to synchronisation pulses $\hat{S}$ fed to this transmitter by a sync.pulse generator 8. The pulse generator 8 also supplies a pulse to the timing circuit 49 to initiate a timing cycle. This radar apparatus continuously scans space with a rotating beam, wide in elevation, whereby targets within the measuring range of the radar apparatus reflect a small portion of the energy transmitted. In order to be able to display azimuth and range of the targets thus detected, the radar apparatus co-operates with a display system comprising a cathode ray tube 9 equipped with orthogonal deflector means such as the schematically represented deflection coils 10 and 11. The input circuits of these coils consist of the deflection amplifiers 12 and 13 respectively. The deflection signals generated by a digital sawtooth generator 16 are fed to these deflection amplifiers via the digital-to-analog converters 14 and 15. Via an "and" gate 17, enabled each time for the duration of a deflection signal interval, this sawtooth generator is connected to a clock-pulse generator 18, whose successive output pulses have a mutual time spacing corresponding to a range increment $\Delta r$. The sawtooth generator consists of two digital integrators which are shown in greater detail on the right hand side of FIG. 2. In these integrators the $\Delta r$ pulses are fed to a range counter 19. This counter is an additive counter of "$n$" binary digit (bit) positions where the maximum range of the radar system is $2^n-1$ times the smallest quantized range increment as defined by the time displacement between any two successive output pulses of clock-pulse generator 18. The counter 19 has $n$ digit positions each physically consisting of a bistable element indicative of a numeric binary value, each digit having a different numeric significance ranging from $2^0$ through $2^n-1$. To simplify the drawing, the range counter 19 in FIG. 2 is shown with only three bistable elements 19a, 19b and 19c. In known manner they are connected to form a scale of two-counter supplying output pulses separated in time. These pulses, indicating the 0—1 transitions of the counter 19, are masked with signals indicative of the sine and cosine of angle information into binary multipliers or masks 23 and 24 to provide deflection signals for cathode ray tube 9 in proportion to the radial sweep and the angular information offered. The digital representation of the sine and cosine are provided by registers 20 and 21 which form the output of angle resolver 22 in FIG. 1. The sine and cosine components are presented in the form $n$ bits of significance plus a sign bit; the sign bit being necessary to indicate the quadrant. The $n$ significant bits are directed to the respective masks 23 and 24 for masking the 0—1 transition signals from counter 19. Each of these masks comprises $n$ "and" gates collectively designated by reference numerals 25 and 26 respectively. These "and" gates pass the output pulses of counter 19 in proportion to the sine and cosine component registered in the sine and cosine registers 20 and 21 respectively. In the above manner the two masks 23 and 24 modify the radial range count and feed via the "or" gates 27 and 28 respectively sets of digital signals to X and Y-counters 29 and 30. These sets of digital signals provide a numerical counting rate indicative of the ordinate and abscissa of the increasing radial range distance in the direction prescribed by the angular information offered. If this angular information varies in accordance with the antenna azimuth the radial sweep of the electron beam which creates the display on the face the cathode ray tube rotates about the center of the tube face in synchronism with the antenna. Any video signals fed to the cathode ray tube 9 via lead 31 (in FIG. 1) will thus cause a light blip or intensified spot to appear on the tube face at a point corresponding to the target position.

According to the invention a particularly favorable and in every respect advantageous PPI display system is obtained, if said angular resolver 22 consists of a digital sine-cosine generator and if the system is further provided with control means 32, which activates said sine-cosine generator only in the time interval between two successive deflection signal intervals (dead time) for the time required by the sine-cosine generator to generate, starting from the angular value offered in digital form in said time interval, the sine- and cosine component for the deflection signals to be produced in the next deflection signal interval (listening time). In other words, the listening time is the time following the transmission of a pulse when returning echoes have a range within the display range of display device, and the dead time is the time between the end of the listening time and the next transmitted pulse. In the example of FIG. 1 use is made of a sine-cosine generator in the form of a digital differential analyzer consisting of two digital integrators, shown in further detail on the left hand side of FIG. 2. In this figure reference numeral 33 designates an angle increment counter having $n$ bit positions each physically consisting of a bistable element. To simplify the drawing only three of these bistable elements 33a, 33b and 33c are shown. During the active or working interval of this sine-cosine generator the angle increment counter 33 is supplied with pulses having a mutual time spacing corresponding with an angle increment $\Delta\theta$. The $n$ bistable elements of this counter are arranged in known manner to form a scale of two-circuit supplying output pulses. These output pulses, indicating the 0—1 transitions of the counter 33, are masked with signals indicative of the content of the sine and cosine registers 20 and 21 respectively in binary multipliers or masks 34 and 35 respectively. Each of the latter consists of $n$ "and" gates, collectively designated 36 and 37 respectively. The sine and cosine registers 20 and 21 each consist of a bi-directional counter to count up or down as required. These registers are each set or reset at a time preceding the active period of the sine-cosine generator and further each 90° interval by a signal fed to these registers via lines 40 and 41 respectively so that they respectively indicate in parallel binary code the initial value 0 and 1 or 1 and 0 according to the quadrant. The sine-cosine signal generator thus far described may be considered to be divided into two parallel channels, one for the sine and one for the cosine components. The output of the binary multipliers 34 and 35 are formed by the "or" gates 38 and 39 respectively. By cross-connecting these "or" gates to the input of the cosine and sine registers 21 and 20 the multiplication factor of the binary multiplier 35 in the cosine channel is determined by the contents of the sine-register while the multiplication factor of the binary multiplier 34 in the sine-channel is determined by the contents of the cosine register 21.

Since the integral of a function and the function itself are identical for exponential functions, this arrangement with proper setting of the initial values produces a sine and a cosine component, the respective values of which are determined by the number of $\Delta\theta$ pulses supplied to counter 33.

In the embodiment shown in FIG. 1 the angular information offered consists of the instantaneous antenna azimuth presented by azimuth counter 44. This counter is coupled via lead 45 to the output of an antenna conversion unit 46 which produces an output pulse with each angle of rotation increment of antenna 5 and a reset pulse as the antenna passes through 0°, 90°, 180° and 270°. Counter 44 counts these output pulses starting anew each time a reset pulse is received, so that the instantaneous azimuth of the antenna 5 as well as the relevant quadrant is continuously represented by the contents of said counter.

The sine-cosine generator 22 is provided with an input circuit 47 which is connected to the output of clock-pulse generator 18 via electronic switching means 48. In the example of FIG. 1 the latter consists of a single "and" gate. The active period of the sine-cosine generator is determined by control unit 32. For this purpose the latter is provided with a timing circuit 49 which is connected to the output of clock-pulse generator 18 via line 50. Immediately following each deflection signal interval (start of dead time) this timing circuit produces a number of consecutive output signals, one of which, through the intermediary of a bistable element 51, enables the said "and" gate 48 to pass clock-pulses to said digital sine-cosine generator. Thus activated, the latter starts determining, in the manner described, the sine and cosine component of an angle which, from the initial value previously introduced, is augmented by an angular increment for each clock-pulse received. In order that the sine and cosine generation may be stopped the moment the required sine and cosine components have been produced, the control unit 32 is further provided with a binary comparator 52 for comparing the angular value offered with the incrementally augmented angular value of which the sine-cosine signal generator determines the sine and cosine component. The moment, that the angular values to be compared are equal said comparator 52 produces a stop pulse which, via the said bistable element 51, disenables the said "and" gate 48, so that the output pulses of clock-pulse generator 18 are no longer passed to said sine-cosine generator. In the embodiment shown in FIG. 1 the said comparator 52 consists of a backward counter. At a given time just preceding the moment at which the "and" gate 48 is enabled, the timing circuit 49 supplies an output pulse which, by enabling "and" gate 53, causes the instantaneous antenna azimuth as available in digital form in the azimuth counter 44 to be transferred to said backward counter. When "and" gate 48 is enabled, the clock-pulses passing this "and" gate are fed on the one hand to the sine-cosine generator 22 and on the other hand via line 54 to said backward counter, whereby the contents of this counter are reduced by one for each clock-pulse received. The moment the contents of this counter have been reduced to zero, this counter produces an output pulse which via the bistable element 51 disenables "and" gate 48, so that the sine-cosine generator 22 and the backward counter 52 no longer receive any clock-pulses, If $n$ is the number of bit-positions of the sine and the cosine register, it can be shown mathematically, that $2\pi.2^n$ clock-pulses are required to be fed to the angle increment counter 33 in order that these registers may traverse a count equal to the register modulus. If $2^n$ were the number of pulses required for the backward counter 52 to traverse a count equal to its counter modulus, the input circuit 47 of the sine-cosine generator would have to be designed to carry out a multiplication by a factor $2\pi$. Preferably, the said input circuit 47 is in the form of a binary multiplier. Circuits of the latter type, however, cannot be realised for multiplication factors larger than 1. Therefore, with the embodiment shown in FIG. 1, the azimuth counter 44 and the backward counter 52 are both counters of $n+3$ bit-positions requiring $2^3.2^n$ input pulses to traverse a count equal to the counter modulus. Remembering, that only $2\pi.2^n$ clock-pulses are required to be fed to the angle increment counter it follows that this number of pulses can be obtained by the use of the multiplication factor $\pi/4$ as $\pi/4.2^3.2^n = 2\pi.2^n$. This multiplication factor permits the input circuit 47 to be in the form of a binary multiplier, as $\pi/4 < 1$.

In comparison with a resolver of the type comprising a digital sine-cosine code disc, the sine-cosine generator as applied in the system according to the invention has the advantage that the number of bits representing the antenna azimuth can be larger, resulting in a greater accuracy.

Moreover, as, in contrast to the known radar systems of the type described in the preamble, this sine-cosine generator only operates for a short period, during the time between two successive deflection signal intervals, further considerable advantages can be realised. For example, the present sine-cosine generator need not be exclusively used for the determination of the sine and cosine component of the instantaneous antenna azimuth $B_a$, but it may also be used in certain selected intervals for determining the sine and cosine component of the angle $\varphi$ of a cursor offered in polar coordinates. Further it may be observed that if the system according to the invention is part of a mobile radar equipment, where a "north-stabilized" display is required, the angle between the north direction and the own course line is represented by the value $k_e$, this $k_e$ value may be offered in digital form, so that prior to each sweep the sine and cosine component of the sum $(B_a + k_e)$ can be calculated, thus obtaining the considerable advantage that any changes of $k_e$ are taken into account each time, immediately prior to a sweep. Moreover, a considerable saving of elements may be obtained. The improved flexibility and the possible saving of elements are illustrated by means of the example shown in FIG. 3.

Here again use is made of a cathode ray tube 9 which is provided with fixed orthogonal deflection coils 10 and 11 to which deflection signals are fed via the deflection amplifiers 12 and 13 respectively. The control unit 32 is shown in this figure framed by dotted lines. The part below the control unit 32 comprises the sine-cosine signal generator and the sawtooth generator, while the part above the control unit comprises six 13-bit registers 44, 56, 57, 58, 59 and 60, an adder 61 and a number of "and" gates 62 to 71 which are controlled by output signals of control unit 32. Register 44 continuously presents in binary form the instantaneous antenna azimuth $B_a$, while register 56 serves as a buffer for storing any picture off-center values which, e.g., can be introduced by means of manually operated control means (not shown) into said buffer. The contents of these registers 44 and 56 may be transferred via the "and" gates 62 and 63 to the input 72 of adder 61. Of the other registers 57, 58 and 59, register 57 serves as a buffer for storing in digital form the instantaneous $k_e$ value, as may occur at the digital output of a gyro-compass (not shown). The registers 58 and 59 also serve as buffers, register 58 serving as a buffer for temporarily storing in digital form any X and Y markers offered and register 59 as a buffer for storing in digital form any cursor off-center values offered. Both registers 58 and 59 can be set e.g. by means of manually operated control means (not shown). The contents of each one of these registers 57, 58 and 59 may be transferred to the input 73 of adder 61 via the "and" gates 64, 65 and 66. Finally register 60 serves as a buffer for storing in digital form the angular value of a desired cursor which at 74 is offered in polar coordinates. The polar coordinates of this cursor may for instance be supplied by a digital computer (not shown).

Figure 3:
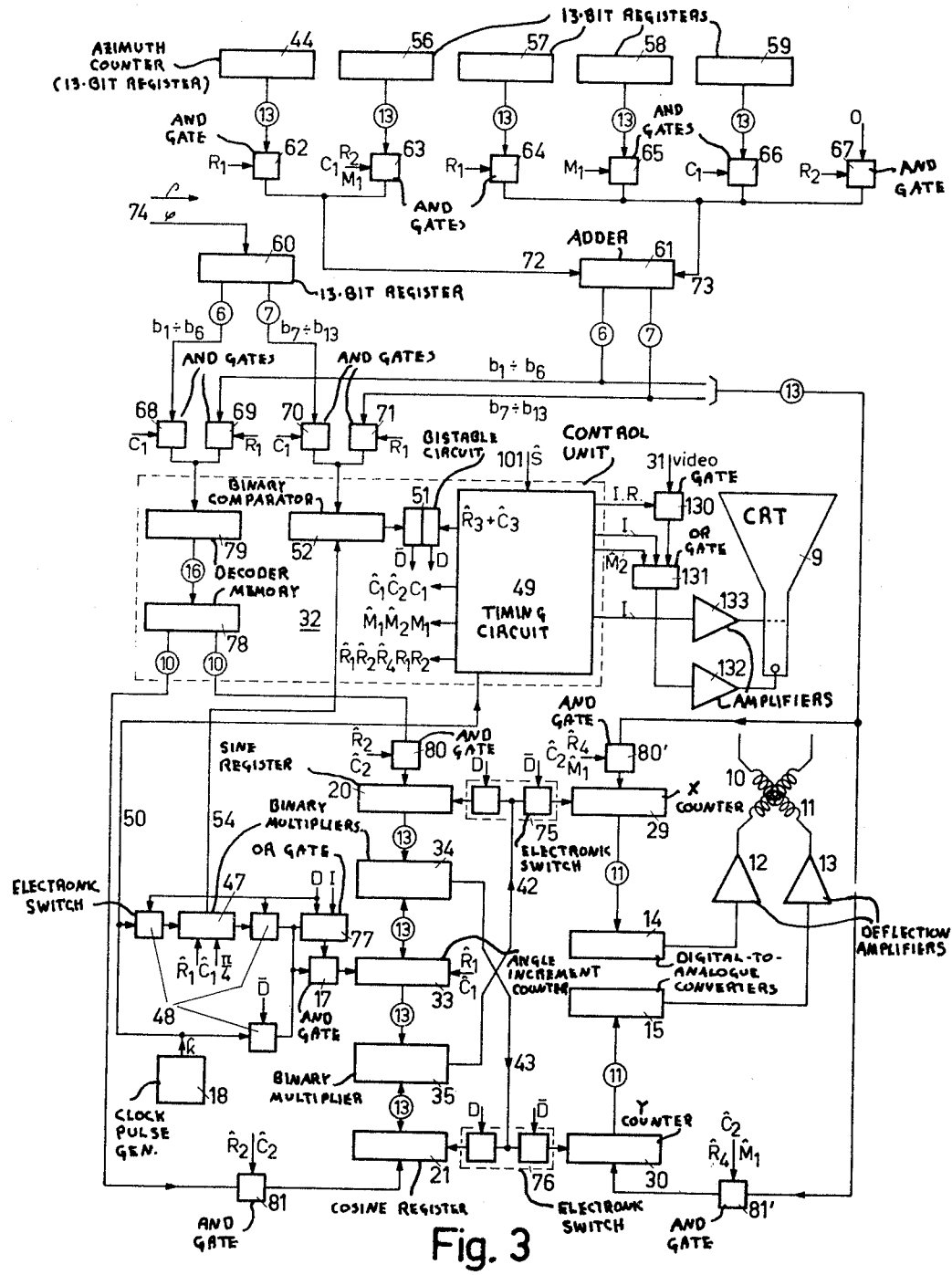
FIG. 3 is a diagram indicating a possible embodiment of the display system according to the invention.

In the example of FIG. 3, a considerable saving of elements is obtained, because the sine-cosine generator and the sawtooth generator are constituted by one and the same pair of digital integrators which function on a time sharing basis. For this purpose switching means which are controlled by said control unit in a manner such that said pair of integrators functions as a sine-cosine generator in the time interval between two successive deflection signal intervals (dead time) and as a sawtooth generator in the subsequent deflection signal interval (listening time), are available.

In the example of FIG. 3, this pair of digital integrators comprises a scale of two-counter 33 of $n$ bistable elements, a sine and a cosine register 20, 21 an X and a Y counter 29 and 30, and first and second binary multipliers 34 and 35, while the said switching means comprise a first pair of electronic switches 75 and 76, and a second pair of electronic switches 48 and 17. The first pair of electronic switches 75 and 76 are simultaneously controlled by said control unit and, depending on their switching position, permit the output of the respective binary multipliers 34 and 35 to be fed via cross-connections 42 and 43, to either the cosine and sine register 21 and 20 or to the Y and X counter 30 and 29 respectively, while the second pair of electronic switches 48 and 17 is controlled by said control unit. The position of these switches determines whether the number of pulses fed to counter 33 is that required for either the sine-cosine signal generation or the sawtooth generation.

For the presentation of markers, and for off-centering the whole PPI display (radar data, markers and cursors, whereby the latter may or may not be off-centered already) the output of adder 61 may be connected to the X and Y counters 29 and 30 by enabling the "and" gates 80' and 81'.

The control unit 32 is similar to the one used in the example of FIG. 1. They both contain a timing circuit 49, a bistable element 51 and a comparator 52. The control unit 32 differs, however, in that it also includes a decoder 79 and a memory 78 in which the sine and cosine component of a predetermined number of angular values are permanently stored. The decoder 79 and the comparator 52 may be connected to either the output of adder 61 by enabling "and" gates 69 and 71 or to the cursor register 60 by enabling the "and" gates 68 and 70. The sine and cosine values stored in the said matrix 78 are the initial values from which the generation of the sine and cosine component may be commenced. It will be clear that less time will be required for the generation of the components if a larger number of initial values are provided. Therefore, in order that the sine and cosine generation may be completed within a given time duration (e.g. $\approx 50$ µsec.) a sufficiently large number of initial values should be available in the memory. An additional advantage of a large number of initial values is increased accuracy. A substantial saving (87.5%) of the memory capacity required may be achieved, however, as, by reason of the fact that $\sin(45° + \alpha) = \cos(45° - \alpha)$, the sine and cosine component of a number of angles between 0° to 45° will suffice as initial values. To this end the sector of 0° to 45° is divided into angles of $45°/2^n$. It can be derived from the duration of the interval in which the sine-cosine generation must be completed that $n=3$ is a most suitable value thus dividing the sector of 45° into eight angles of 5.625° each. The memory 61 will then store in the addresses numbered from 1 to 8 the initial values as indicated in Table I.

direction of the sine and cosine registers, so that the sine register will count backward instead of forward and the cosine register forward instead of forward and the cosine register forward instead of backward. Considering the

TABLE I

| Address | Bit No. | | | | | | | | | | Bit No. | | | | | | | | | | Angel, ° |
|---|---|---|---|---|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 | 7 | 8 | 9 | 10 | |
| 1 | 0 | 0 | 0 | 0 | 0 | 0 | 0 | 0 | 0 | 0 | 1 | 1 | 1 | 1 | 1 | 1 | 1 | 1 | 1 | 1 | 0 |
| 2 | 0 | 0 | 0 | 1 | 1 | 0 | 0 | 1 | 0 | 0 | 1 | 1 | 1 | 1 | 1 | 1 | 1 | 0 | 1 | 1 | 5.625 |
| 3 | 0 | 0 | 1 | 1 | 0 | 0 | 0 | 1 | 1 | 1 | 1 | 1 | 1 | 1 | 1 | 0 | 1 | 1 | 0 | 0 | 11.25 |
| 4 | 0 | 1 | 0 | 0 | 1 | 0 | 1 | 0 | 0 | 1 | 1 | 1 | 1 | 1 | 0 | 1 | 0 | 1 | 0 | 0 | 16.875 |
| 5 | 0 | 1 | 1 | 0 | 0 | 0 | 0 | 1 | 1 | 1 | 1 | 1 | 1 | 0 | 1 | 1 | 0 | 0 | 1 | 0 | 22.5 |
| 6 | 0 | 1 | 1 | 1 | 1 | 0 | 0 | 0 | 1 | 0 | 1 | 1 | 1 | 0 | 0 | 0 | 0 | 1 | 1 | 1 | 28.125 |
| 7 | 1 | 0 | 0 | 0 | 1 | 1 | 1 | 0 | 0 | 1 | 1 | 1 | 0 | 1 | 0 | 1 | 0 | 0 | 1 | 1 | 33.75 |
| 8 | 1 | 0 | 1 | 0 | 0 | 0 | 1 | 0 | 0 | 1 | 1 | 1 | 0 | 0 | 0 | 1 | 0 | 1 | 1 | 1 | 39.375 |
| | SIN | | | | | | | | | | COS | | | | | | | | | | |

On FIG. 4 are shown 13 bistable elements, designated $b_1$–$b_{13}$, which constitute the output register of adder 61.

successive octants in the manner described the various switching states may be specified as indicated in Table II.

TABLE II

| | | SIN | | | | COS | | | |
|---|---|---|---|---|---|---|---|---|---|
| Angle | Oct. | Mem. | Address | Reg. | $b_7$–$b_{13}$ | Mem. | Address | Reg. | $b_7$–$b_{13}$ |
| 0–45 | I | Sin | 1–8 | Fwd. | Norm. | Cos | 1–8 | Bwd. | Norm. |
| 45–90 | II | Cos | 8–1 | Bwd. | Compl. | Sin | 8–1 | Fwd. | Compl. |
| 90–135 | III | Cos | 1–8 | Bwd. | Norm. | Sin | 1–8 | Fwd. | Norm. |
| 135–180 | IV | Sin | 8–1 | Fwd. | Compl. | Cos | 8–1 | Bwd. | Compl. |
| 180–225 | V | Sin | 1–8 | Fwd. | Norm. | Cos | 1–8 | Bwd. | Norm. |
| 225–270 | VI | Cos | 8–1 | Bwd. | Compl. | Sin | 8–1 | Fwd. | Compl. |
| 270–315 | VII | Cos | 1–8 | Bwd. | Norm. | Sin | 1–8 | Fwd. | Norm. |
| 315–0 | VIII | Sin | 8–1 | Fwd. | Compl. | Cos | 8–1 | Bwd. | Compl. |

Owing to the bi-valency of the system, the 6 higher order bits that may be present in the bistable elements $b_1$–$b_6$ indicate the angles of 180°, 90°, 45°, 22.5° and 5.625° respectively. The decoder 79 is connected to the bistable elements $b_4$, $b_5$ and $b_6$ and by means of said decoder any one of the sine and cosine components available in memory 78 can be read-out. The sine-cosine component thus selected may be transferred to the sine and cosine registers 20 and 21 by enabling the respective "and" gates 80 and 81. Table I shows that in address No. 8 the sine and cosine component of an angle of 39.375° is stored. The angle of 45° is not available in the memory. If the angle offered is equal to 45°, the contents of comparator 52 represent an angle that is equal to 45°−39.375°=5.625°. The latter angle is the angle which must be added by temporarily activating the sine-cosine generator.

In FIG. 5 part of the sine and cosine curves are shown. These curves intersect at 45°. On these curves the sine and cosine components available in the memory are indicated by dots; thus the dot designated S8 refers to the sine component which is stored in the matrix at address No. 8. Considering FIG. 5 it may be noted that for angles from 45° to 90°, the cosine components are to be fed to the sine register 20 and the sine components to the cosine register 21 whereby, moreover, the sequence of the addresses must be reversed. Since the angle of 45° is not available in the memory, the cosine component fed to the sine register 20 will always be the cosine of an angular value which exceeds the proper angular value by at the most 5.625°. In order to obtain e.g. sin α (see FIG. 5), sin (α+β) is fed to the sine register, this sin (α+β) being provided by that part of the memory in which the cosine components are stored. The angle β is in excess and should be eliminated. The contents of the last seven bit positions $b_7$−$b_{13}$ represent the angle γ. Since β is the complement of the angle γ, the required elimination of the angle β can be effected by transferring this complement β to comparator 52 and by simultaneously reversing the counting As shown by this table the sine component should be transferred to the cosine register and the cosine component to the sine register for angles in the sectors from 45° to 135° and from 225° to 315°. In these sectors it is also necessary to reverse the counting direction of the sine and cosine registers. The switching operations required can be effected in a simpler manner. To this end, use is made of the fact that only if the contents of the output register of adder 61 indicate an angle in said sectors, either the output marked 90 of bistable element $b_2$ is at its high value and the output marked $\overline{45}$ of bistable element $b_3$ is at its low value, of the output marked $\overline{90}$ of $b_2$ is at its low value and the output marked 45 of $b_3$ is at its high value. By feeding the output voltages of $b_2$ and $b_3$ in the way indicated in FIG. 4 to two "and" gates 83 and 84 connected to an "or" gate 82, the latter will provide an output voltage which is high only when the angles offered are in said sectors (octants II, III, VI and VII). The output voltage of "or" gate 82 is applied on the one hand direct via lead 85, and on the other hand via an inverter 86 to the sine and cosine registers 20, 21, whereby this output voltage, when it is at its high value, causes the sine register to count backward instead of forward and the cosine register to count forward instead of backward. The output voltage of "or" gate 82 is moreover, applied to the "and" gates 87 and 88 while the inverted output voltage is applied to "and" gates 89 and 90, so that the sine and cosine components of memory 78, depending upon whether the said output voltage is at its low or at its high value, will either be transferred via "and" gates 89 and 90 and "or" gates 91 and 92 to the sine and cosine registers 20 and 21 respectively, or cross-wise via "and" gates 88 and 87 and "or" gates 92 and 91 to the cosine and sine registers 21 and 20 respectively. Table II further shows that decoder 79, for angles in the IIth, IVth, VIth and VIIIth octant, must indicate the addresses of memory 78 in reversed order, while the complement of the angle present in $b_7$ through $b_{13}$, in these octants, must be transferred to comparator 52. The switching operation required can be realised in a simple way by controlling the plurality of "and" gates 93 and 94 by the output voltages of $b_3$. The sign of the generated cosine component is obtained by feeding the output voltages of $b_1$ and $b_2$ in the way indicated in FIG. 4a to two "and" gates 96 and 97 connected to an "or" gate 95, whereby the sign of the cosine is derived from a bistable element 98 that is connected to the output of "or" gate 95. The sign of the generated sine component is derived from a bistable element 99 connected as indicated in the FIG. 4a to the output marked 180 of $b_1$. The purpose of the bistable elements 98 and 99 is to maintain the sign during the sweep time so that a possible change in the contents of the azimuth counter during the sweep time will not affect the sign.

Returning to FIG. 3, it may be observed that timing circuit 49 is designed to control the display system in accordance with a fixed program which is repeated during successive cycles each of 15 successive sync·pulse intervals. This program is such that it causes a radar sweep to be produced in each one of 14 successive sync·pulse intervals, and that immediately hereafter, the time interval extending from the end of the 14th deflection signal interval to the end of the 15th sync·pulse interval is used for:

(a) The generation of the sine and cosine component of an angle $\varphi$ as presented by the contents of the cursor register 60;

(b) Writing this cursor;

(c) Writing a marker in accordance with the X and Y values as presented by the output register of adder 61; and (d) The generation of the sine and cosine component of the angular value as presented by the output register of adder 61 for the radar sweep to be written in the first sync·pulse interval of the next cycle.

Figure 6:
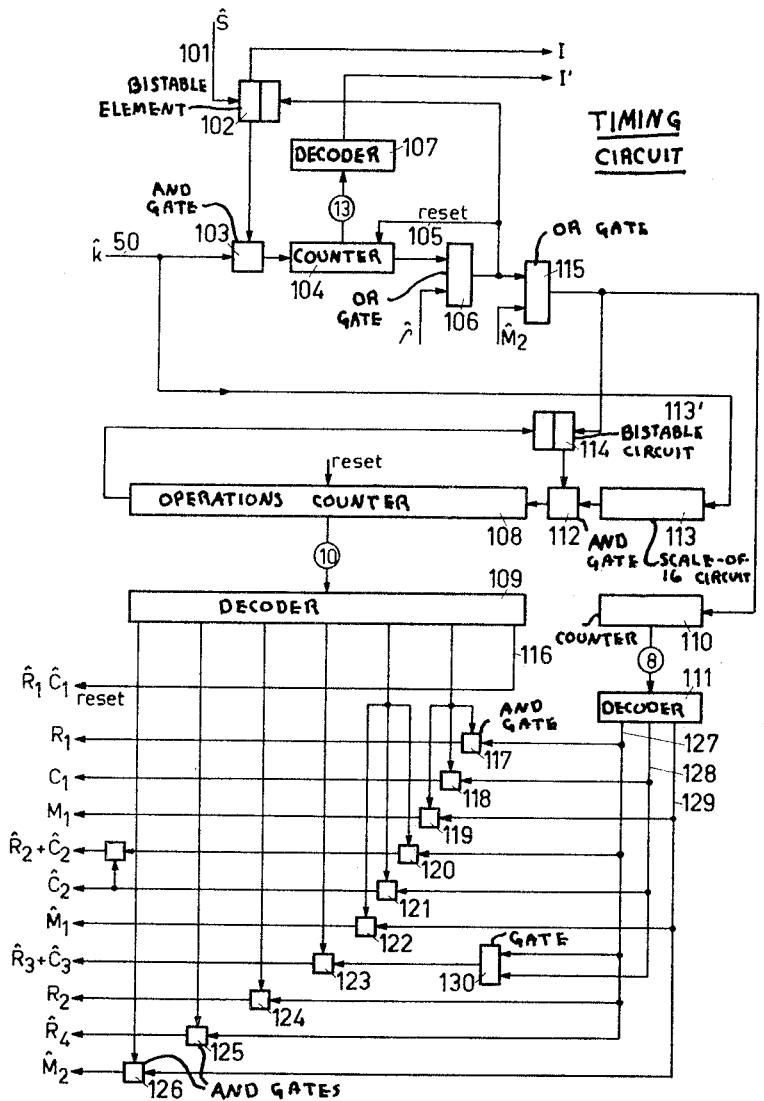
FIG. 6 is a diagram illustrating a possible embodiment of a timing circuit as used in the system of FIG. 3; and in FIG. 7 a number of timing diagrams are shown for explaining the operation of the system of FIG. 3.

FIG. 6 illustrates the timing circuit 49, and shows a bistable element 102 to which the sync.pulses $\hat{S}$ are fed via lead 101. On receipt of such a sync.pulse the output of bistable element 102 enables "and" gate 103 to pass clock-pulses to a counter 104. This counter is so designed that when started by a sync.pulse and permitted to count clock-pulses for a time equal to the duration of the deflection interval, it will produce an output pulse which will then stop and reset the counter. To this end, the output pulse is applied via a first "or" gate 106 to on the one hand bistable element 102 so as to close "and" gate 103, and on the other hand via lead 105 to said counter for resetting the latter. It is to be noted, however, that counter 104 in the interval allocated to the presentation of a cursor, is stopped and reset by the $\hat{\rho}$-pulse offered at 74 in FIG. 3, this $\hat{\rho}$-pulse, being applied to the input marked $\hat{\rho}$ of "or" gate 106. Counter 104 is further connected to a decoder 107, which, during the active period of said counter supplies via its output lead I' output signals that are used for the presentation of range rings. During this active period bistable element 102 provides an output signal I that is used as an intensity control signal and as a switching signal.

The timing circuit is further provided with an operations counter 108, having a decoder 111 as output. The input of counter 108 is connected via an "and" gate 112 to the output of a scale of sixteen circuit 113 consisting of four bistable elements to which, via lead 113', clock-pulses are fed. The purpose of the scale of sixteen circuit 113 is to bring the clock-pulse repetition frequency down to a submultiple thereof. Through the intermediary of bistable element 114 counter 108 is started by the output signal of a second "or" gate 115 to which the output pulse of the first "or" gate 106 and a pulse marked $\hat{M}_2$ are applied as input signals. The input pulse marked $\hat{M}_2$ is generated by the timing circuit itself and appears at the end of the interval in which a marker is written. The output signal of the second "or" gate 115 is, moreover, applied to a rounds counter 110 which counts deflection signal intervals. This counter consists of four bistable elements arranged to count $2^4=16$ deflection intervals after which it is reset ot start anew. Every time that operations counter 118 is started by an output pulse of the second "or" gate 115, this output pulse is also applied to rounds counter 110. The time required by operations counter 108 to traverse a count equal to the counter modulus is only a small part of the time between two successive input pulses of rounds counter 110. Therefore, decoder 109 in this time interval will provide in rapid succession a number of output signals. With the exception of the output signal occurring at output lead 116, these output signals are applied to the respective "and" gates numbered from 117 through 126. The output of rounds counter 110 is extended to a decoder 111 so that, depending upon the contents of rounds counter 110, certain groups of the above mentioned output signals may be selected. To this end decoder 111 is arranged in such a manner that during the first fourteen successive pulses applied to rounds counter 110 an output voltage will occur only at output lead 177 of decoder 111, with the 15th input pulse applied to rounds counter 110 an output voltage will occur only at the output lead 128, while with the sixteenth input pulse applied to rounds counter 110 an output voltage will appear only at output lead 129, after which this cycle will repeat itself since rounds counter 110 is reset and starts anew. When output lead 127 provides an output voltage, "and" gates 117, 120, 124 and 125 connected to this output lead together with "and" gate 123 connected to this lead via the "or" gate 130, will be enabled by said output voltage, so that, after the reset signal supplied by lead 116, the signals indicated by $R_1$, $\hat{R}_2$, $\hat{R}_3$, $R_2$ and $\hat{R}_4$ will occur in succession. Similarly, the reset signal and the signals indicated by $C_1$, $\hat{C}_2$ and $\hat{C}_3$ will occur, when output lead 128 provides an output voltage enabling "and" gates 118, 121 and 123, whereas when, after the reset signal, lead 129 provides an output voltage the output signals $M_1$, $\hat{M}_1$ and $\hat{M}_2$ will appear in succession, since then the "and" gates 119, 122 and 126 are enabled.

Figure 7:
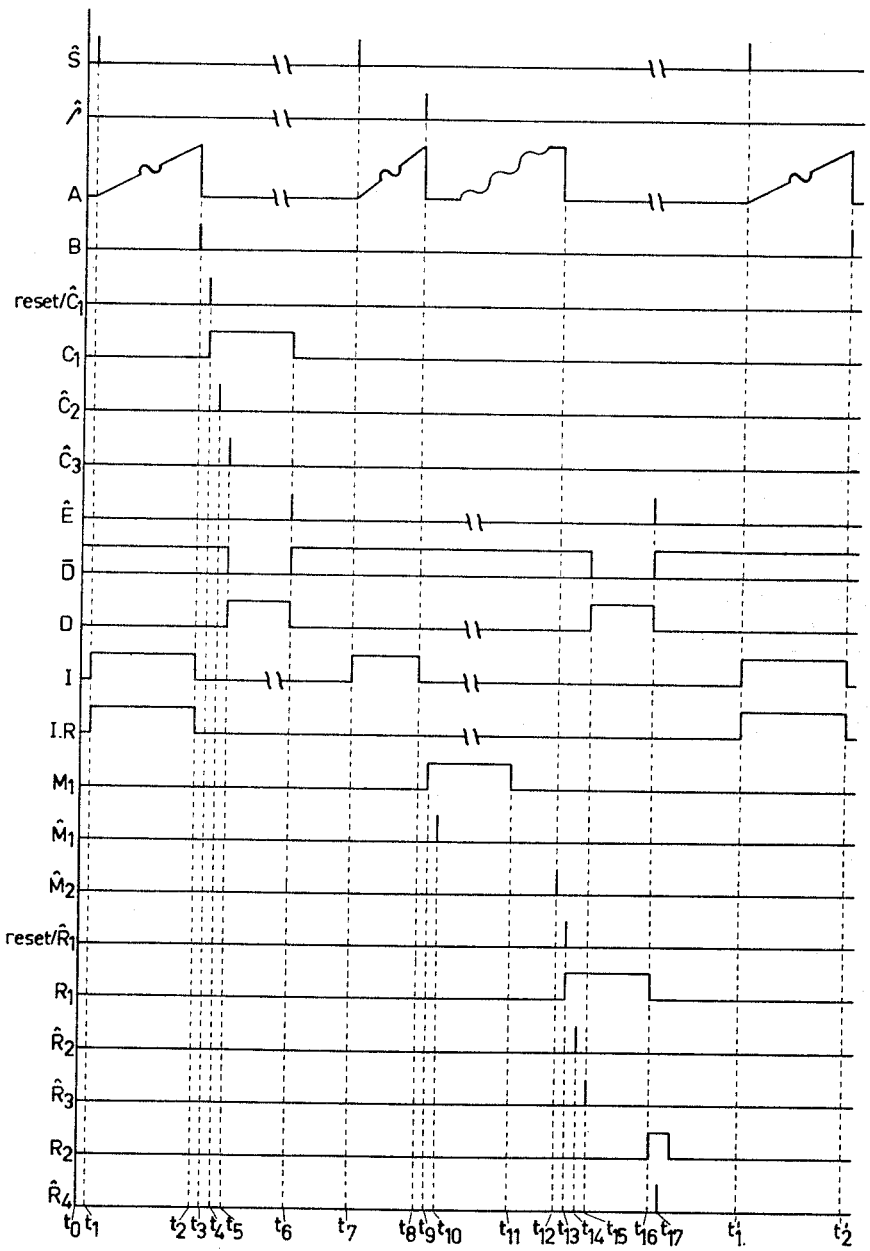

In FIG. 7 is shown a time diagram for explaining the operation of the embodiment shown in FIG. 3 as well as the timing circuit forming part of it. In this time diagram sync.pulses $\hat{S}$ occur at the instant $t_1$, $t_7$, $t_1'$. The sync.pulse occurring at the instant $t_1$ initiates a deflection signal A, a switching and intensity control signal I, and a switching signal I.R. These signals last until the time $t_2$. The switching signal I.R. controls the video gate 130 in FIG. 3, so that a video signal occurring during the sweep will be passed via "or" gate 131 and video amplifier 132 to cathode ray tube 9. The intensity control signal I is applied via an amplifier 132 to the intensity control electrode of cathode ray tube 9. This signal I is also used as a switching signal as will be explained below. At the time $t_2$ counter 104 (in FIG. 6) produces the output pulse shown at B. Via the first and second "or" gates 106 and 115 this output pulse is applied to rounds counter 110 and it also causes operations counter 108 to be started. Assuming the sweep produced in the time interval $t_1$ to $t_1$ to be the last sweep of fourteen successive radar sweeps, the pulse applied to rounds counter 110 at the time $t_2$ will cause the decoder 111 to provide an output pulse on lead 128 instead of on lead 127. As explained, the timing circuit will then furnish in succession the control signals reset/$\hat{C}_1$, $\hat{C}_1$, $\hat{C}_2$ and $\hat{C}_3$. The timing of these control signals is shown in FIG. 7. The signal reset/$\hat{C}_1$ occurring at the time $t_3$ consists of a pulse of short duration which as shown in FIG. 3 is applied to the counters 33 and 47 whereby these counters are reset to zero. The signal $C_1$ consists of a square wave voltage lasting from $t_3$ to $t_6$. As shown in FIG. 3, this signal is applied to the "and" gates 63, 66, 68 and 70 so as to transfer the picture off-center values and cursor off-center values available in the registers 56 and 59 to adder 61 and to transfer the contents of the cursor register 60 to decoder 79 and comparator 52. The decoder 79 then supplies the address of the sine cosine component available in the memory 78. These components must be transferred to the sine and cosine registers 20 and 21 as initial values. For this purpose the signal $\hat{C}_2$ occurring at the time $t_4$ and consisting again of a pulse of short duration, is applied to the "and" gates 80 and 81. Moreover, the signal $\hat{C}_2$ is applied to the "and" gates 80' and 81' so that the sum of the picture off-center values and the cursor off-center values as available in the output register of adder 61 will be transferred to the X and Y counters 29 and 30. The signal $\hat{C}_3$ occurring at the time $t_5$, also consists of a pulse of short duration. This pulse is applied to the bistable element 51, which then produces in response to this the square-wave voltage shown at D in FIG. 7 lasting until the time at which the comparator 52 supplies the stop pulse indicated at $\hat{E}$ in FIG. 7. The square-wave voltage D occurs over a time interval extending from $t_5$–$t_6$. In this time interval, the generation of the sine and cosine components is carried out. The said square-wave voltage D is fed to the electronic switches 75, 76, 48 and 17, which in turn, cause the said set of integrators to function as a sine-cosine signal generator and start the integration process by closing a circuit via which the required input pulses are supplied to the sine-cosine signal generator. This integration process is stopped at the time $t_6$ at which the contents of the sine and cosine register 20, 21 represent the sine and cosine component of the angle $\varphi$ of the cursor offered. Owing to the fact that the integration process is stopped by returning the bistable element 51 to its original state the bistable element will produce the square-wave output voltage shown as $\overline{D}$. The latter is applied to the electronic switches 75, 76, 48 which in turn cause the said set of digital integrators to function as a sawtooth generator.

At the time $t_7$ a new sync.pulse occurs. As shown in FIG. 6 this sync. pulse is applied to bistable element 102 which then provides the square-wave voltage shown at I in FIG. 7. The duration of this square-wave voltage I is dependent upon the time at which the $\hat{p}$-pulse occurs at the input of the first "or" gate 106. In the present case the said square-wave voltage E is supposed to last from $t_7$–$t_8$. In the example of FIG. 3 this square-wave voltage is applied both to the "or" gate 131 and via "or" gate 77 to "and" gate 17. Thus enabled, the latter passes input pulses to said set of digital integrators which in this interval function as a sawtooth generator to produce the deflection signals required for the presentation of a cursor that will be off-centered in accordance with the off-center values previously transferred to the X and Y counter 29 and 30. The $\hat{p}$-pulse occurring at time $t_8$ causes the operations counter 108 to be started again and at the same time causes the contents of rounds counter 110 to be increased by 1 so that now output lead 129 of decoder 112 will provide an output voltage instead of lead 128. The timing circuit then provides the output signals $M_1$, $\hat{M}_1$ and $\hat{M}_2$ shown in FIG. 7. The signal $M_1$ consists of a square-wave voltage occurring over a time interval extending from $t_9$ to $t_{11}$. In the example of FIG. 3 this square-wave voltage is applied to the "and" gates 63 and 65 so as to transfer the picture off-center values, available in the register 56 and the X and Y values of an intended marker as available in register 58 to adder 61. At the time $t_{10}$ the signal $\hat{M}_1$ occurs. This signal consisting of a pulse of short duration is applied to the "and" gates 80' and 81' so as to transfer the sum available in the output register of adder 61 to the X and Y counter 29 and 30 respectively. The electron beam of tube 9 will then move to the desired position of the marker as determined by the X and Y values present in the X and Y counters. Subsequently, at the time $t_{12}$, the signal $\hat{M}_2$ consisting of a pulse of short duration, is applied to "or" gate 131 in FIG. 3 whereby the desired marker is made visible on the tube face. The pulse $\hat{M}_2$ is also applied to the second "or" gate 115 in FIG. 6 so that the operations counter 108 is started again and output lead 127 of decoder 111 supplies an output voltage instead of lead 129. The timing circuit then supplies the signals which in FIG. 7 are shown as reset/$\hat{R}_1$, $R_1$, $\hat{R}_2$, $\hat{R}_3$, $R_2$ and $\hat{R}_4$. The signal reset/$\hat{R}_1$ consists of a pulse of short duration occurring in FIG. 7 at the time $t_{13}$. In the example of FIG. 3 this pulse is applied to the counters 33 and 47 thus resetting them to zero. The signal $R_1$ consists of a square-wave voltage occurring over a time interval extending from $t_{13}$ to $t_{16}$. This signal is applied to the "and" gates 62, 64, 69 and 71 so as to transfer the antenna azimuth $B_a$ as presented by the contents of register 44, and the $k_e$ value presented by the contents of register 57 to adder 61 and also to connect the decoder 79 and the comparator 52 to the output register of said adder 61. The decoder 79 then supplies the address of the sine and cosine values which, as initial values, must be transferred from memory 78 to the sine and cosine registers 20 and 21 respectively. This is achieved by the signal $\hat{R}_2$ consisting of a short pulse occurring at the time $t_{14}$ which enables the "and" gates 80 and 81 sufficiently long to effect this transfer. The signal $\hat{R}_3$, occurring at the time $t_{15}$, consists of a pulse of short duration which is applied to bistable element 51 thus causing the latter to produce the square-wave voltage D. The duration of this square-wave voltage beginning at the time $t_{13}$, is dependent upon the time at which the comparator 52 produces the stop-pulse shown in FIG. 7 at $\hat{E}$. In the time diagram of FIG. 7 this stop pulse occurs at the time $t_{16}$, so that the square-wave voltage D occurs over a time interval extending from $t_{13}$ to $t_{16}$. In this time interval the generation of the sine and cosine component of the angular value offered takes place. Similarly, as in the cursor interval, this square-wave voltage is applied to the electronic switches 75, 76 and 48 and 17 which in turn cause the said set of integrators to function as sine-cosine signal generator while at the same time, in order that the integration process may take place the circuit is closed via which the required input pulses are fed to this sine-cosine signal generator. At the time $t_{16}$ at which the integration process is stopped, the contents of the sine and cosine registers 20 and 21 will be equal to the sine and cosine component of the angle $(B_a+k_e)$. From this time $t_{16}$ the bistable element 51 in FIG. 3 again provides the square-wave voltage represented as $\overline{D}$. The latter is applied to the electronic switches 75, 76 and 48 which in turn cause the said set of digital integrators to function as a sawtooth generator. The signal $R_2$ occurs at the time $t_{16}$. In the example of FIG. 3 this signal is applied to the "and" gate 63 and 67 so as to allow the picture off-center values, as presented by the contents of the register 56, to become available in the output register of adder 61. These picture off-center values are then transferred to the X and Y counters 29 and 30 respectively, since the "and" gates 80' and 81' are enabled by the signal $\hat{R}_4$ occurring at the time $t_{17}$. At the time $t'_1$ a new sync.pulse occurs which is applied to bistable element 102 in FIG. 6 which then again supplies the switching and intensity control signal I. The duration of this signal is determined by counter 104 in FIG. 6 which supplies the output pulse represented at B in FIG. 7 at the time $t'_2$. This pulse is applied to rounds counter 110 via the first and second "or" gates 106 and 115 and also causes the operations counter 108 to be starter. During the active period of the counter 104 bistable element 102 again supplies the switching and intensity control signal I. This square-wave voltage occurs in FIG. 7 over a time interval extending from $t'_1$ to $t'_2$. By way of "or" gate 77, this signal is applied to "and" gate 17, which is thus enabled to pass the clock pulses needed for the generation of the deflection signals. These deflection signals cause a radar sweep which is off-centered in accordance with the off-center values previously transferred to the X and Y counters 29 and 30. This radar sweep is the first one of a new cycle in which 14 successive radar sweeps, a cursor and a marker are again produced.

It is to be understood that the timing circuit of FIG. 6 is given by way of example only, and more particularly to illustrate the flexability of the PPI system according to the invention. Accordingly a timing circuit of a design different from the one shown may be used. The number of radar sweeps, cursors and markers written in each cycle may also be choosen differently.

Finally, it may be observed that the set of digital integrators, as used for the sine-cosine signal generator and for the sawtooth generator, may be realised using summators instead of binary multipliers.

What is claimed is:

1. In a radar system of the type having a rotatable antenna, PPI display means, resolver means for producing digital signals corresponding to the sine and cosine of the bearing of information to be displayed, and means responsive to said digital signals for producing deflection signals for said display means during deflection signal intervals of predetermined duration following pulse transmissions of the transmitter of said radar system; the improvement wherein said resolver means comprises digital differential analyzer means, and means for activating said analyzer means to produce said digital signals only during intervals between succesive deflection signals intervals.

2. In a radar system of the type having a rotatable antenna, PPI display means, resolver means for producing digital signals corresponding to the sine and cosine of the bearing of information to be displayed on said display means, first and second digital storage means connected to store said digital signals corresponding to the sine and cosine of said bearing respectively, timing circuit means for producing a first gating signal during deflection signal intervals of predetermined duration following pulse transmissions of the transmitter of said radar system, means for producing deflection signals for said display system, means connecting said means for producing deflection signals to said first and second storage means, and means for activating said means for producing said deflection signals with said first gating signal; the improvement wherein said resolver means comprises digital differential analyzer means, and means connecting said analyzer means to said first and second storage means, and said timing circuit means comprising means for producing a second timing signal, and means responsive to said second timing signal for activating said analyzer means only during intervals between successive deflection signal intervals.

3. The system of claim 2 comprising a source of clock pulses, wherein said means for activating said analyzer means comprises gate means responsive to said second timing signal for applying said clock pulses to said analyzer means only during said intervals between successive signal intervals, and said analyzer means comprises first and second digital integrators having a common input circuit, and means applying the output of said gate means to said common input circuit.

4. The system of claim 3 comprising a source of azimuth digital signals corresponding to the azimuth of information to be displayed, binary comparator means, means for applying the output of said gate means to said binary comparator means, second gate means connected to apply said azimuth signals to said comparator means, and means responsive to an output from said comparator means for closing said first mentioned gate means, wherein said timing circuit means further comprises means for producing a pulse for momentarily opening said second gate means before said first mentioned gate means is opened by said second timing signal, whereby the number of said clock pulses applied to said common input circuit is a function of said azimuth of said information to be displayed.

5. The system of claim 4 comprising bistable circuit means having first and second inputs, and means connecting the output of said bistable circuit means to control said first mentioned gate means, said means responsive to said second timing signal comprising means for applying said second timing signal to said first input of said bistable circuit means, and said means responsive to said output of said comparator means comprising means applying the output of said comparator means to said second input of said bistable circuit means.

6. In a pulse radar system of the type having a PPI display means and means for producing the deflection signals for said display means; the improvement wherein said means for producing deflection signals comprises a source of clock pulses, counter means, first and second binary multiplier means, cosine and sine register means, means applying the output of said counter means and sine register means to said first binary multiplier means, means applying the outputs of said counter means and cosine register means to said second binary multiplier means, an X- and Y-counter, a first digital-to-analogue converter connected to the output of said Y-counter, first and second gate means for applying the outputs of said second and first multiplier means to said sine and cosine register means respectively, third and fourth gate means for applying the outputs of said second and first multiplier means to said X- and Y-counter respectively and timing means connected to apply clock pulses to said counter means and open said third and fourth gate means during deflecting signal intervals of predetermined duration following transmission of radar pulses by said radar system, and to apply clock pulses to said counter means and open said first and second gate means during intervals between adjacent said deflecting signal intervals, said first and second gate means being closed when said third and fourth gate means are open, and said third and fourth gate means being closed when said first and second gate means are open, whereby said deflection signals are produced at the outputs of said digital-to-analogue converters.

References Cited

UNITED STATES PATENTS

| | | | |
|---|---|---|---|
| 3,134,974 | 5/1964 | Orenstein | 343—11 |
| 3,159,830 | 12/1964 | Macaulay | 343—11 X |
| 3,178,709 | 4/1965 | White et al. | 343—16 X |

RICHARD A. FARLEY, Primary Examiner

MALCOLM F. HUBLER, Assistant Examiner

U.S. Cl. X.R.

343—16

PO-1050
(5/69)

UNITED STATES PATENT OFFICE
CERTIFICATE OF CORRECTION

Patent No. 3500402  Dated March 10, 1970

Inventor(s) HENDRIK TEUNIS HUELE ET AL

It is certified that error appears in the above-identified patent and that said Letters Patent are hereby corrected as shown below:

Column 1, line 37, "feedinng" should be --feeding--

Column 8, lines 2 and 3, delete "and the cosine register forward ubstead of forward"

Column 9, line 22, "hereafter" should be --thereafter--

Column 10, line 60, "$t_1$" should be --$t_2$--

Column 10, line 65, "$\hat{c}_1, \hat{c}_1, \hat{c}_2$ and $\hat{c}_3$" should be --$\hat{c}_1, c_1, \hat{c}_2$ and $\hat{c}_3$--

Column 12, line 68, "starter." should be --started.--

Column 14, line 34, chang "Y-Counter" to --X-counter-- and immediately following insert --and a second digital-to-analogue converter connected to the output of said Y-counter,--

Signed and sealed this 22nd day of Sept. 1970.

(SEAL)
Attest:

Edward M. Fletcher, Jr.
Attesting Officer

WILLIAM E. SCHUYLER, JR.
Commissioner of Patents